(12) United States Patent
Whitworth et al.

(10) Patent No.: US 9,108,395 B2
(45) Date of Patent: *Aug. 18, 2015

(54) SINGLE VACUUM DEBULK COMPOSITE PANEL REPAIR

(71) Applicant: BELL HELICOPTER TEXTRON INC., Hurst, TX (US)

(72) Inventors: Denver Whitworth, North Richland Hills, TX (US); Anthony Bergerson, Cedar Hill, TX (US); Michael Marvin, North Richland Hills, TX (US)

(73) Assignee: BELL HELICOPTER TEXTRON INC., Hurst, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/307,115

(22) Filed: Jun. 17, 2014

(65) Prior Publication Data

US 2014/0299255 A1   Oct. 9, 2014

Related U.S. Application Data

(63) Continuation of application No. 11/064,824, filed on Feb. 25, 2005, now Pat. No. 8,790,485.

(51) Int. Cl.
*B32B 37/10* (2006.01)
*B29C 65/18* (2006.01)
*B29C 65/00* (2006.01)
(Continued)

(52) U.S. Cl.
CPC .............. *B32B 37/1018* (2013.01); *B29C 65/18* (2013.01); *B29C 66/80* (2013.01); *B29C 66/82423* (2013.01); *B29C 66/91221* (2013.01); *B29C 66/91411* (2013.01); *B29C 66/91445* (2013.01); *B29C 73/10* (2013.01); *B32B 37/003* (2013.01); *B32B 37/10* (2013.01);
(Continued)

(58) Field of Classification Search
CPC ............ B32B 2305/07; B32B 2398/00; B32B 2556/00; B32B 2605/18; B32B 37/003; B32B 37/10; B32B 37/1018
USPC .......... 156/285–287, 381, 382; 264/511, 552, 264/553, 571, 102
See application file for complete search history.

(56) References Cited

U.S. PATENT DOCUMENTS 3,993,520 A   11/1976   Werner et al.
4,357,193 A   11/1982   McGann et al.
(Continued)

FOREIGN PATENT DOCUMENTS

EP   0 839 635   5/1998

OTHER PUBLICATIONS

Indian Examination Report dated Feb. 28, 2014 in corresponding Indian Patent Application No. 4248/CHENP/2007.

*Primary Examiner* — Christopher Schatz
(74) *Attorney, Agent, or Firm* — Pillsbury Winthrop Shaw Pittman LLP (57) ABSTRACT

A method of attaching a composite member to a structure. The method including forming a laminate of fabric impregnated with resin; applying heat at a first temperature to the impregnated laminate; applying vacuum at a first pressure to the impregnated laminate to degas the resin and form a degassed, impregnated laminate; positioning the degassed, impregnated laminate on a structure; and curing the degassed, impregnated laminate on the substrate by applying heat at a second temperature and by applying vacuum at a second pressure.

18 Claims, 10 Drawing Sheets

(51) Int. Cl.
  *B29C 73/10* (2006.01)
  *B32B 37/00* (2006.01)

(52) U.S. Cl.
  CPC ........ *B32B 2305/07* (2013.01); *B32B 2398/00* (2013.01); *B32B 2556/00* (2013.01); *B32B 2605/18* (2013.01)

(56) References Cited

U.S. PATENT DOCUMENTS

| | | | |
|---|---|---|---|
| 4,409,048 A | 10/1983 | Hatch et al. | |
| 4,409,270 A | 10/1983 | Faber et al. | |
| 4,554,036 A | 11/1985 | Newsom | |
| 4,560,428 A | 12/1985 | Sherrick et al. | |
| 4,652,319 A | 3/1987 | Hammond | |
| 4,659,624 A | 4/1987 | Yeager et al. | |
| 4,732,639 A | 3/1988 | Newsom | |
| 4,769,197 A | 9/1988 | Kromrey | |
| 4,808,253 A | 2/1989 | Mimbs | |
| 4,820,564 A | 4/1989 | Cologna et al. | |
| 4,855,182 A | 8/1989 | Ondrejas et al. | |
| 5,116,216 A | 5/1992 | Cochran et al. | |
| 5,131,834 A | 7/1992 | Potter | |
| 5,286,438 A | 2/1994 | Dublinski et al. | |
| 5,374,388 A | 12/1994 | Frailey | |
| 5,424,105 A | 6/1995 | Stewart | |
| 5,442,156 A | 8/1995 | Westerman et al. | |
| 5,492,466 A | 2/1996 | Frailey | |
| 5,595,692 A | 1/1997 | Folsom et al. | |
| 5,738,741 A | 4/1998 | Crasto et al. | |
| 5,753,271 A | 5/1998 | Heimerdinger | |
| 5,958,166 A | 9/1999 | Walters et al. | |
| 6,036,464 A | 3/2000 | Heimerdinger et al. | |
| 6,107,976 A | 8/2000 | Purinton | |
| 6,149,749 A | 11/2000 | McBroom | |
| 6,206,067 B1 | 3/2001 | Kociemba et al. | |
| 6,222,007 B1 | 4/2001 | Cano et al. | |
| 6,270,603 B1 | 8/2001 | Westerman et al. | |
| 6,385,836 B1 | 5/2002 | Coltrin | |
| 6,468,372 B2 | 10/2002 | Kociemba et al. | |
| 6,561,247 B2 | 5/2003 | Chou et al. | |
| 6,679,965 B1 | 1/2004 | Thompson et al. | |
| 6,758,924 B1 | 7/2004 | Guijt | |
| 6,761,783 B2 | 7/2004 | Keller et al. | |
| 8,790,485 B2 * | 7/2014 | Whitworth et al. | 156/285 |
| 2003/0075259 A1 | 4/2003 | Graham | |
| 2003/0188821 A1 | 10/2003 | Keller et al. | |

* cited by examiner

| Title: Wet Layup Process Single Vacuum |
|---|
| Page 2 of 7 |

1. APPLICATION 1.1 Wet Layup Process

Wet layup is a process in which dry woven carbon or glass cloth is impregnated with a liquid adhesive and then cured to form a laminate. The wet layup process is used to manufacture substructure details or make repair patches for complex contoured surfaces which cannot accept a flat precured repair patch.

1.2 Single Vacuum Debulk Method

This module contains the information required to prepare a single vacuum repair patch and/or filler for a composite repair. The procedures contained in this module are intended to be used to prepare the patch and filler as determined in the damage inspection module. This module does not contain the information required to apply the patch to the aircraft or cure the patch.

2. RESTRICTIONS

For 12 ply laminates or more use SMP-29M1

3. FLOW CHART

4. REFERENCES

Title: Wet Layup Process Single Vacuum

Page 3 of 7

5. EQUIPMENT LIST

N/A

6. MATERIAL LIST

Fabric: 3K-70-PW Graphite
Separator Film: FEP, Bagging Film
Porous Teflon: TX1040
Style 120 fiberglass cloth:
Non-porous Film: FEP, Non-bondable Tedlar
Fiber Reinforced Non-porous Teflon: Adhesive backed TX1040, Armalon
Style 181 fiberglass cloth (or equivalent 2 plies 120 weave glass)
Vacuum Bag Sealant Tape: Tacky tape
Impregnating resin: EA9390
Vacuum Bag:
Breather: N10
Teflon Tape

7. PROCEDURES

7.1 Materials Preparation.

7.1.1 Templates should be prepared for each ply of the patch. The 0 degree orientation and ply number should be marked on each template to facilitate lay up.

7.1.2 Calculate the amount of fabric required to fabricate the patch by arranging the templates on flat work surface with the 0 degree orientation properly aligned. Use the fabric width minus 2 inches (excess) as a width constraint. Measure the maximum length and width of the arranged templates. Add a 2 inch excess to the maximum length to determine the amount of fabric required to fabricate the patch. Cut a length of fabric to the required size.

7.1.3 Cut 2 sheets of separator film (or 1 sheet that can be folded in half) made of transparent or translucent bagging film that are at least 4 inches larger than the fabric cut in step 7.1.2.

7.1.4 Smooth one sheet of the separator film cut in 7.1.3 on a flat work surface. Place the fabric cut in 7.1.2 in the center of the film so that there is at least 2 inches of excess film around the perimeter of the fabric. Place the second sheet of separator film over the fabric aligning the edges of the film together.

Note: It is advisable to tape the separator film to the work surface to keep the top film aligned with the bottom film in subsequent steps.

| Title: Wet Layup Process Single Vacuum |
|---|

Page 4 of 7

7.1.5 Cut 2 sheets of porous teflon so that they are 1 inch larger than the largest ply of the patch.

NOTE

Bleeder plies for fiberglass must be of the same type weave as the laminate.

Example: 1581 weave laminates 10 plies thick will require 1 bleeder of 1581 weave cloth.

For GLASS: The number of bleeder plies is determined by the ratio of 1 ply of bleedercloth for every 10 plies of patch.

7.1.6 For Carbon Cut the required 120 weave fiberglass used as bleeder plies so that they are 1 inch larger than the largest ply of the patch. The number of bleeder plies is determined by the ratio of 1 ply bleeder cloth for every 4 plies of patch. Sizing of the bleeders is based on patch geometry.

7.1.7 Cut one ply of non-porous film so that it is at least 1/2 inch larger than the porous teflon cut in 7.1.5 perforate with scribe on 2" centers.

7.2 Tool Preparation. See Figure SMP-29M2-1.

7.2.1 Place two plies of dry 181 weave fiberglass (or equivalent) on the base plate to insulate the heater blanket from the base plate.

7.2.2 Place the heater blanket on the insulation on the base plate.

7.2.3 Place a control thermocouple at the center of the heater blanket. (zoned heaters)

7.2.4 Cover the aluminum caul sheet with fiber reinforced non-porous teflon film.

7.2.5 Mark the orientation (0, 45) on the caul sheet with a permanent marker.

7.2.6 Place the caul sheet prepared in 7.2.4 on the heater blanket.

7.2.7 Place 1 piece of porous teflon cut in 7.1.5 on the caul sheet.

7.2.8 Place a bead of vacuum bag sealant tape around the perimeter of the base plate.

FIG. 6-3

| Title: Wet Layup Process Single Vacuum |
|---|
| Page 5 of 7 |

7.3 Wet Lay Up and Patch Fabrication 7.3.1 Calculate the amount of resin required to impregnate the fabric cut in 7.1.2 with 22 (±1) grams of resin per square foot of fabric using the following formula:

Required Resin per ply (g) – Fabric Length (ft) X Fabric Width (ft) x 22 (g/ft$^2$)

7.3.2 Mix the required amount of resin to the mix ratio specified for the resin.

7.3.3 Lift the top piece of separator film stacked in 7.1.4 to allow access to the fabric.

7.3.4 Pour the resin over the entire surface of the fabric using a back and forth pattern to dispense evenly. Use a spreader tool (spatula) to wet out and work the resin into the fabric as evenly as possible.

7.3.5 Place the top piece of separator film removed in 7.3.3 back over the fabric and smooth with a cloth to remove air and wrinkles.

7.3.6 Work the spreader tool over the separator film to remove any air entrapped between the separator film and the fabric. Work the material until there is no air remaining between the separator film and the fabric taking care to remove as little resin from the fabric as possible. When the air is removed from between the upper separator film and the fabric, turn over and remove the air from between the opposite side.

7.3.7 Trace the templates on the top sheet of separator film over the fabric and identify each ply with the 0 degree orientation and ply number. Maintain fiber alignment and allow 1 inch excess at the fabric edges.

7.3.8 Cut out the patterns marked on the upper separator film without disturbing the separator film and fabric stack up.

7.3.9 Verify the lay up sequence by stacking the patch plies in numerical sequence prior to lay up.

7.3.10 Starting with the first ply of the patch, stack the plies in the center of the porous release film placed on the caul sheet in 7.2.7 while maintaining the correct orientation for each ply in relationship to the orientation marked on the caul sheet. Ensure the separator film is removed from both sides of each ply during the lay up process.

FIG. 6-4

| Title: Wet Layup Process Single Vacuum |
|---|

| Page 6 of 7 |
|---|

7.4 Single Bag Processing of Wet Lay Up Patch and/or Filler. See Figure SMP-29M2-2 for schematic.

7.4.1 Place a piece of porous teflon prepared in 7.1.5 over the patch prepared in 7.3.10 taking care to align the edges of the porous teflon with the edges of the porous teflon on the bottom of the patch. With a permanent marker, mark the 0 degree orientation of the porous teflon to match the orientation from the caul sheet.

7.4.2 Place the non-porous release film prepared in 7.1.7 over the bleeder plies prepared in 7.1.6 maintaining a uniform overlap around the perimeter of the bleeder plies.

7.4.3 Place the bleeder plies and perforated non-porous release film over the patch prepared in 7.4.1 taking care to align the edges of the bleeder plies with the edges of the porous teflon. Tape the perforated non-porous release film to the caul sheet.

7.4.4 Cover the base plate and lay up assembly with 2 plies of 181 weave dry fiberglass (or equivalent) breather to within 1 inch of the bag sealant compound on the base plate.

7.4.5 Connect the thermocouple to the controller so that the thermocouple will control the time/temperature profile. Connect the heater blanket to the controller.

7.4.6 Place a flexible vacuum bag over the base plate and seal to the base plate. (If the base plate is not equipped with a vacuum fitting, it is acceptable to use a vacuum fitting through the bag.) Apply a 25.0" Hg minimum vacuum on the part. (A dedicated vacuum pump is recommended to insure vacuum level integrity.)

7.4.7 Check bag for leaks by blocking the vacuum supply to the bag. The vacuum level must not drop more than 5" Hg vacuum over a 5 minute time period. Repair or replace the bag until the bag can meet the leakage requirement. Reapply vacuum to the bag when leak check is complete.

7.4.8 Set vacuum on bag to 2" Hg (±1: Hg). For 6 plies or greater. 6 plies or less set vacuum to 25" Hg min 7.4.9 Heat the patch to 125°F (+5/-0°F) at 3°F/minute (maximum) and hold for 90 (+5/-0) minutes if patch is thicker than 16 plies (if patch is 16 plies or less, hold at temperature for 60 (+5/-0) minutes) while maintaining 2" Hg (+/-1" Hg)

7.4.10 Without cooling the laminate, turn off the heater blanket and vent the vacuum from the bag 7.4.11 Remove the patch from the caul sheet keeping the patch and porous teflon intact for later use.

SINGLE VACUUM DEBULK COMPOSITE PANEL REPAIR

CROSS REFERENCE TO RELATED APPLICATIONS

This application is a continuation of U.S. patent application Ser. No. 11/064,824, filed Feb. 25, 2005, which is hereby incorporated by reference herein in its entirety.

FIELD OF THE INVENTION

The present invention relates to the attachment of a laminate of fabric to a structure. In particular, illustrated embodiments of the present invention relate to providing fabric patches to composite structures, such as vehicles including helicopters.

BACKGROUND

U.S. Pat. No. 5,442,156 to Westerman et al.; U.S. Pat. No. 5,595,692 to Folsom et al.; and U.S. Pat. No. 4,659,624 to Yeager et al. are examples of composite structures or repairs and each is incorporated herein by reference thereto in its entirety, respectively.

SUMMARY OF THE INVENTION

One aspect of an embodiment of the invention is a method of attaching a composite member to a structure, comprising: forming a laminate of fabric impregnated with resin; applying heat at a first temperature to the impregnated laminate; applying vacuum at a first pressure to the impregnated laminate to degas the resin and form a degassed, impregnated laminate; positioning the degassed, impregnated laminate on a structure; and curing the degassed, impregnated laminate on the substrate by applying heat at a second temperature and by applying vacuum at a second pressure.

Another aspect of an embodiment of the invention includes a method of attaching a composite patch to a structure to repair the structure, comprising: forming a laminate of fabric impregnated with resin; shaping the laminate to correspond to an area of a structure needing repair; applying heat at a first temperature to the impregnated laminate; applying vacuum at a first pressure to the impregnated laminate to degas the resin and form a degassed, impregnated laminate; positioning the degassed, impregnated laminate on the area of the structure needing repair; and curing the degassed, impregnated laminate on the area needing repair by applying heat at a second temperature and by applying vacuum at a second pressure.

Another aspect of an embodiment of the invention includes a method of attaching a composite patch to a structure to repair the structure, comprising: forming a laminate of fabric impregnated with resin; shaping the laminate to correspond to an area of a structure needing repair; applying the laminate to the area of the structure needing repair; applying heat at a first temperature to the impregnated laminate; applying vacuum at a first pressure to the impregnated laminate to degas the resin and form a degassed, impregnated laminate; and curing the degassed, impregnated laminate on the area needing repair by applying heat at a second temperature and by applying vacuum at a second pressure.

Aspects, features, and advantages of this invention will become apparent from the following detailed description when taken in conjunction with the accompanying drawings, which are a part of this disclosure and which illustrate, by way of example, the principles of this invention.

BRIEF DESCRIPTION OF THE DRAWINGS

The accompanying drawings facilitate an understanding of the various embodiments of this invention. In such drawings:

FIGS. 6-1 to 6-6 illustrate an embodiment of a repair process in accordance with an embodiment of the subject invention.

DESCRIPTION OF ILLUSTRATED EMBODIMENTS

Figure 1:
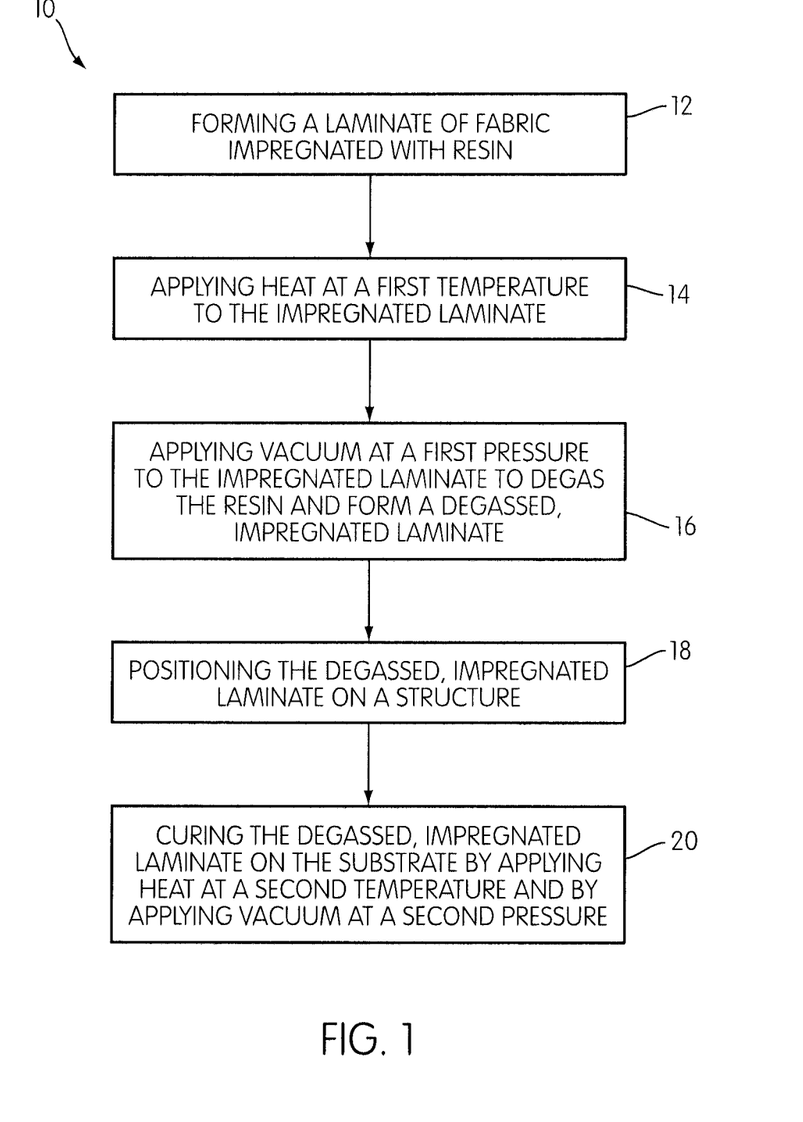
FIG. 1 illustrates a method in accordance with one embodiment of the subject invention.

FIG. 1 illustrates one embodiment of the present invention. In particular, FIG. 1 illustrates a method 10 of attaching a composite member to a structure, including: forming a laminate of fabric impregnated with resin 12; applying heat at a first temperature to the impregnated laminate 14; applying vacuum at a first pressure to the impregnated laminate to degas the resin and form a degassed, impregnated laminate 16; positioning the degassed, impregnated laminate on a structure 18; and curing the degassed, impregnated laminate on the substrate by applying heat at a second temperature and by applying vacuum at a second pressure 20.

Figure 2:
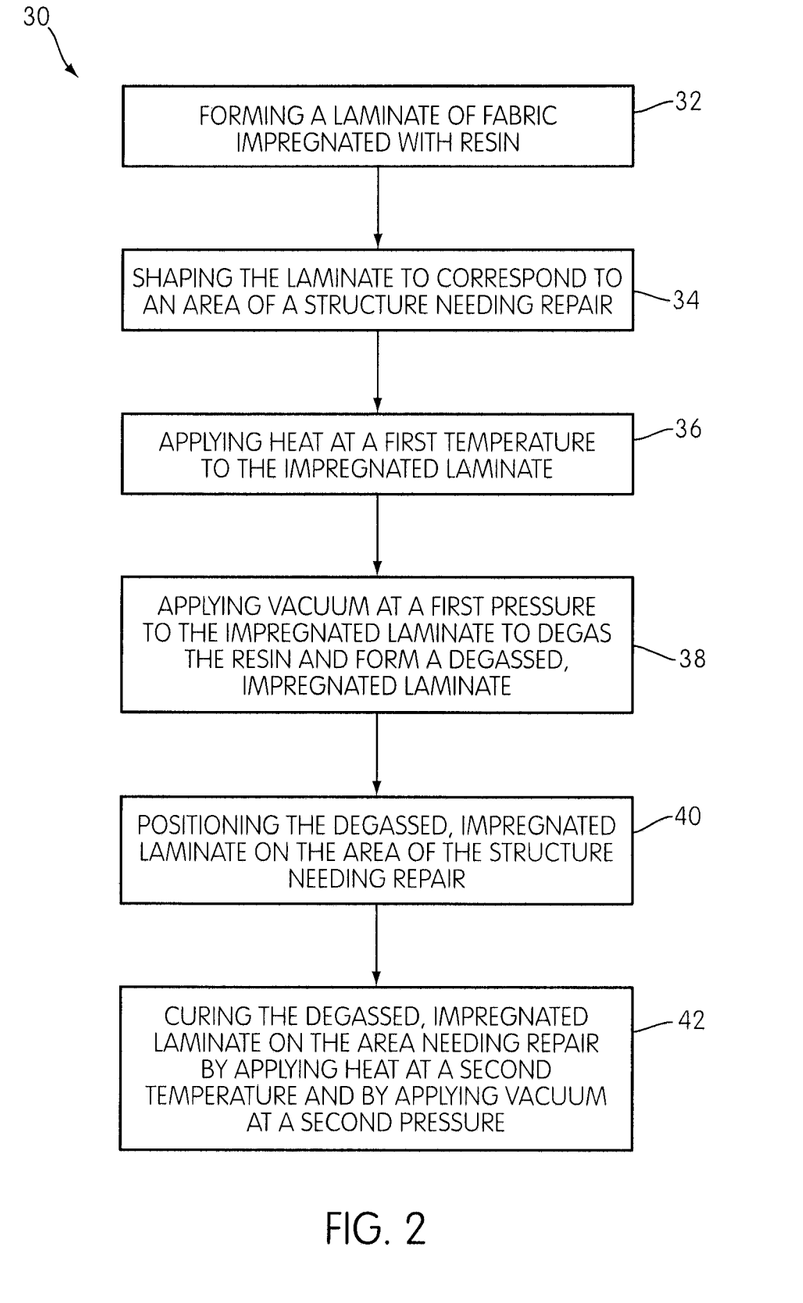
FIG. 2 illustrates a method in accordance with another embodiment of the subject invention.

FIG. 2 illustrates another embodiment of the present invention. In particular, FIG. 2 illustrates a method 30 of attaching a composite patch to a structure to repair the structure, comprising: forming a laminate of fabric impregnated with resin 32; shaping the laminate to correspond to an area of a structure needing repair 34; applying heat at a first temperature to the impregnated laminate 36; applying vacuum at a first pressure to the impregnated laminate to degas the resin and form a degassed, impregnated laminate 38; positioning the degassed, impregnated laminate on the area of the structure needing repair 40; and curing the degassed, impregnated laminate on the area needing repair by applying heat at a second temperature and by applying vacuum at a second pressure 42.

Figure 3:
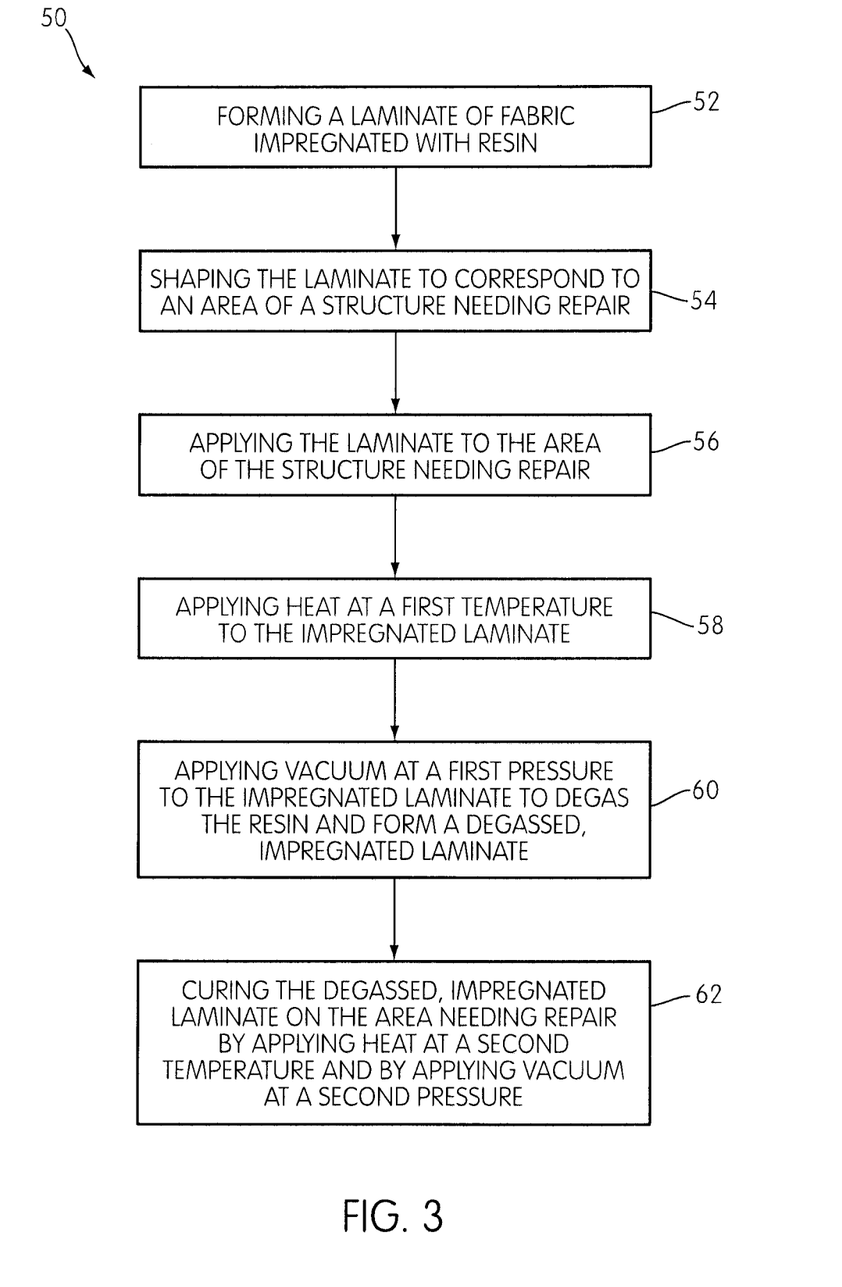
FIG. 3 illustrates a method in accordance with yet another embodiment of the subject invention.

FIG. 3 illustrates a further embodiment of the present invention. In particular, FIG. 3 illustrates a method 50 of attaching a composite patch to a structure to repair the structure, comprising: forming a laminate of fabric impregnated with resin 52; shaping the laminate to correspond to an area of a structure needing repair 54; applying the laminate to the area of the structure needing repair 56; applying heat at a first temperature to the impregnated laminate 58; applying vacuum at a first pressure to the impregnated laminate to degas the resin and form a degassed, impregnated laminate 60; and curing the degassed, impregnated laminate on the area needing repair by applying heat at a second temperature and by applying vacuum at a second pressure 62.

Figure 4:
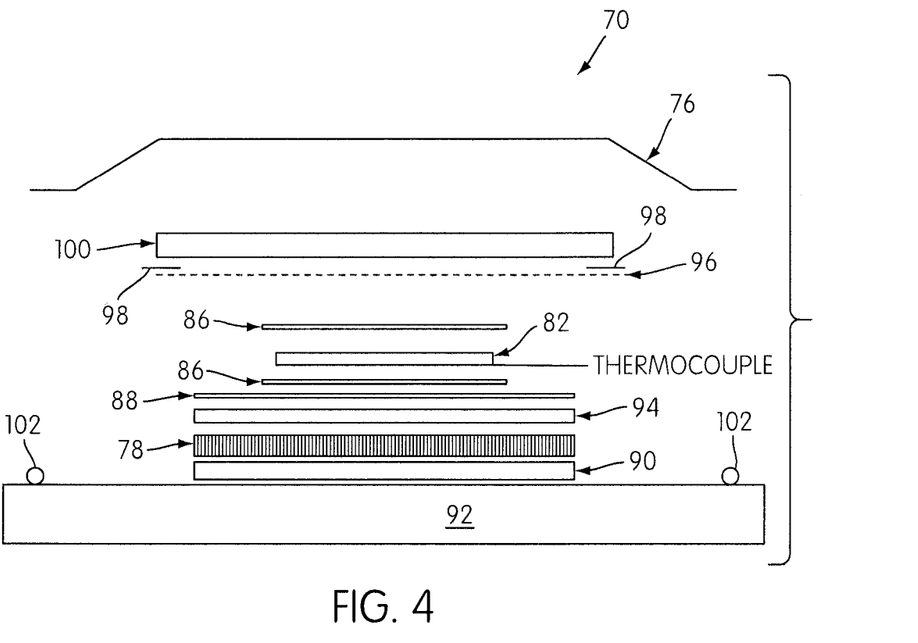
FIG. 4 illustrates an exploded view of a curing schematic in accordance with a further embodiment of the subject invention.
Figure 5:
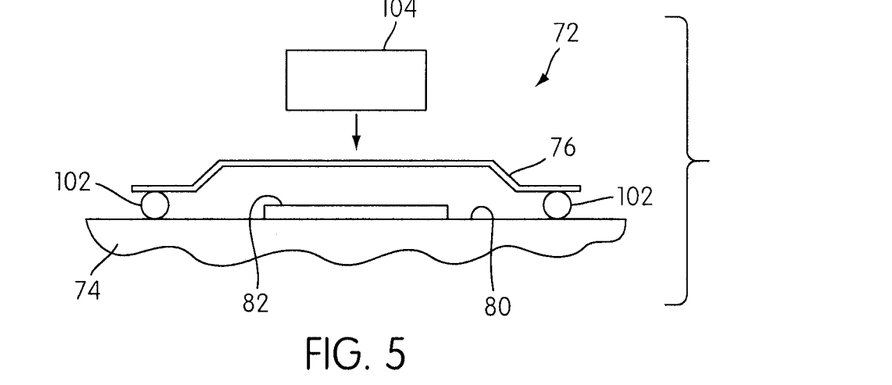
FIG. 5 illustrates a curing schematic in accordance with an embodiment of the subject invention.
Figure 61:
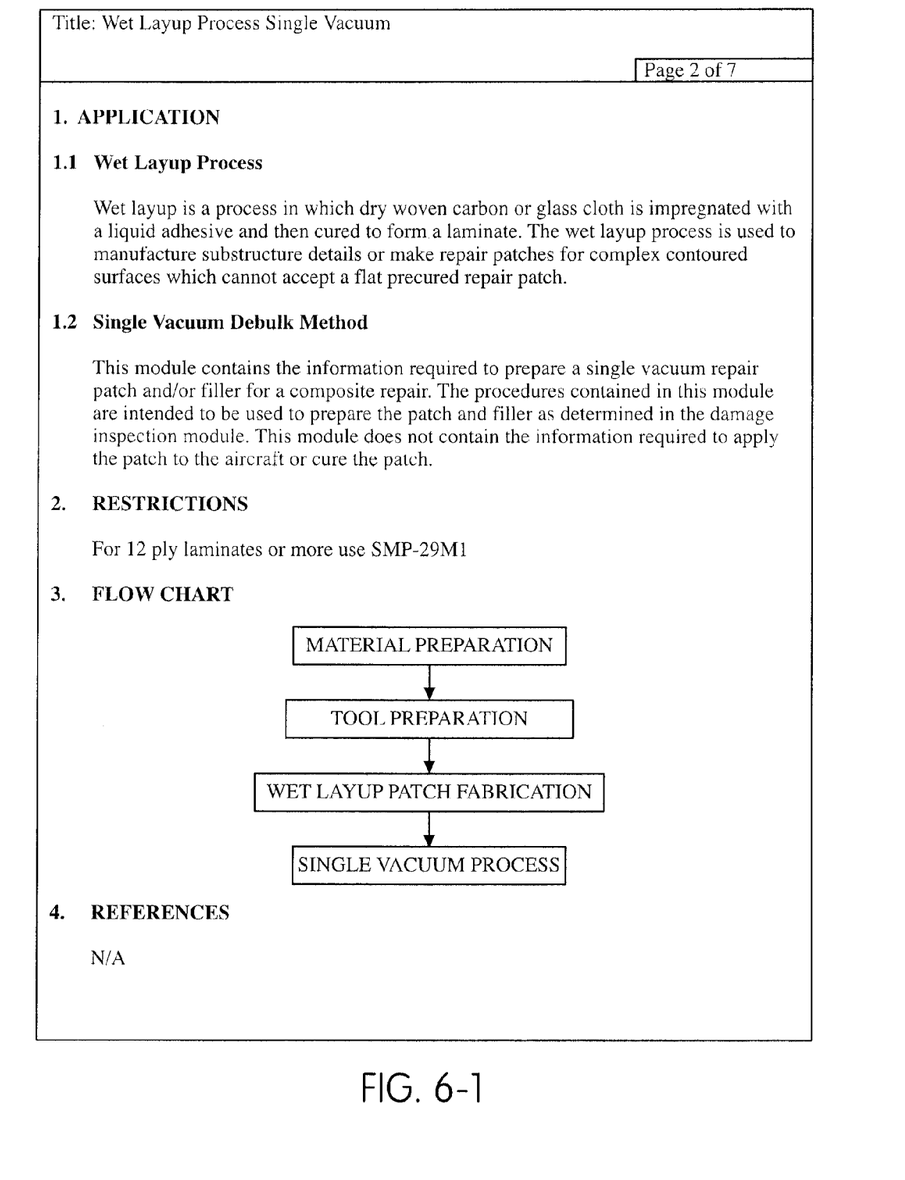

FIGS. 4 and 5 illustrate embodiments of tooling and materials that can be employed to carrying out a particular embodiment of the invention, such as, for example, the methods illustrated in FIGS. 1-3 and the particular embodiment of forming a repair patch as set forth in FIGS. 6-1 to 6-6. The assembly 70 in FIG. 4 and the assembly 72 in FIG. 5 relate to methods of repair or manufacture for a composite panel 74. In particular, the assembly 70 includes providing a vacuum device such as a vacuum bag 76 and a heating device such as a heater blanket 78 for an on-site repair wherein a debulking or degassing cycle 16, 38, 60 is performed to a repaired area 80 of composite material utilizing vacuum and applied heat prior to the curing stage 20, 42, 62, which includes the application of vacuum and heat, but at increased levels relative to the levels used during the degassing cycles 16, 38, 60.

One aspect to achieving the high quality of repair in the embodiments is the use of a debulk cycle 16, 38, 60 prior to the curing phase 20, 42, 62 of the repair. This allows any volatiles generated by the resin to degas from the patch 82 before the resin and fabric are consolidated for curing. The result is a near void free, reproducible laminate 82 without clean room requirements or restrictions.

The embodiments described herein employ a curing step that debulks (degasses) the resin system under a low vacuum prior to applying full compaction (vacuum) pressure. Thus, a multi-step vacuum level combined with a multi-step temperature profile is one novel aspect of this new process.

The embodiments of FIGS. 4 and 5 produce an autoclave-quality composite repair capable of being installed on-site, that is, at the vehicle being repaired, using only a vacuum bag 76 and a heater blanket 78. Other previous methods have employed autoclaves or dedicated equipment that made the repair difficult to make on-site, such as, for example, a double vacuum debulk repair that uses dedicated tooling such as a rigid vacuum box. The assemblies 70 and 72 of the present invention, on the other hand merely use a collapsible vacuum bag 76 and a heating device such as blanket 78. In the past, the part 80 would have to be scrapped or removed and sent to a repair facility for autoclave processing.

The embodiments of the invention are capable of producing an autoclave-quality composite repair merely using a vacuum bag 76 and a heater blanket 78. The method of the embodiments of the present invention permit the tools and materials to be readily available and easily transported and the repair methods can be performed right on the structure to be repaired, such as on-aircraft in the field while using room temperature storable materials (resin and fabric).

The method of the embodiment of the invention permit repairs to be done on vehicles such as aircraft, at the aircraft's location. Additionally, repairs of structural parts are possible and since the laminates 82 of the embodiments are of autoclave quality, the thickness and weight required for any repair may be reduced. Further, the embodiments provide predictable laminate properties that can be calculated with a reproducible process and the embodiments are especially helpful with thick laminates.

The illustrated embodiments of FIGS. 4 and 5 may relate to the repair of composite parts for a vehicle, such as a helicopter or other structures utilizing high quality composites (e.g., fiberglass and graphite). In particular, the repair methods disclosed herein are intended for composite repairs requiring restoration of load bearing properties.

FIGS. 6-1 through 6-6 illustrate in detail a proposed repair process 84 in accordance with an embodiment of the invention. It should be understood that the process of FIGS. 6-1 through 6-6 is merely one embodiment of the various embodiments that may formulate a repair process embodiment in accordance with the invention.

Referring to FIGS. 4, 5 and 6-1 through 6-6, a method and assembly is illustrated in particular for application to a helicopter and further for repair of a structural composite part of a helicopter. In the repair process, a single patch 82 is formed to repair structure 74, which may a part of a helicopter. As stated in the repair process 84, templates are used to cut fabric, such as fiberglass or carbon fiber, in desired shapes to address the area 80 of structure 74 needing repair (Steps 7.1.1, 7.1.2). The fabric is impregnated with an appropriate resin and together the various layers of impregnated fabric are configured and stacked to form the appropriate laminate, which will form patch 82 (Step 7.3). The number of layers of fabric forming the laminate of patch 82 may vary depending on the specific structural requirements for each particular patch 82 application. For example, laminates having 4 to 24 layers of fabric may be used in some applications.

The impregnated laminate 82 is positioned between layers of porous material 86, such as porous Teflon and positioned on a nonporous layer 88, which is itself positioned on stack of items including a heater blanket 78 that is insulated by insulation 90 from base plate 92. A caul sheet 94 is positioned between the heater blanket 78 and the nonporous layer 88 (Steps 7.2). A perforated nonporous layer 96 is secured by tape 98 to the caul sheet 94 (Step 7.4.1). A breather layer 100 is positioned over the nonporous layer 96 and the vacuum bag 76 is sealed over the entire stacked assembly surrounding patch 82 and is secured in a substantially air-tight manner to base plate 92 by a sealing element such as sealant tape 102 (Step 7.4.6).

The heater blanket 78 is activated to heat patch 82 at a first temperature that is typically lower than the ultimate curing temperature. As mentioned in Step 7.4.9 of FIG. 6-5, an example of a first temperature is approximately 125 degrees (F.) at a rate of approximately 3 degree (F.) a minute while holding for approximately 90 minutes if the patch is thicker than 16 plies, while a patch less than 16 plies would hold the temperature for approximately 60 minutes while maintaining approximately 2 in. of Hg. On the other hand, an example of a curing temperature may be approximately 200-250 degrees (F.) at a heat-up rate of approximately 2-8 degrees (F.) per minute.

At the same time as the first, degassing temperature is applied to patch 82, a vacuum is drawn to a desired vacuum pressure that is typically not as great as the vacuum pressure drawn for ultimate curing of the patch 82. As mentioned in Step 7.4.8 of FIG. 6-5, the vacuum bag 76 is configured to pull, through the use of conventional vacuum-forming apparatus, for example, approximately 2 inches of Hg for a patch 82 that is 6 plies or greater. Then, during curing, typically a vacuum pressure greater than that used during degassing will be employed to cure the patch 82. Thus, a greater vacuum force is used for ultimately curing the patch 82 on structure 74 than is used initially during degassing of the patch 82.

The use of a vacuum and the application of heat on patch 82 acts to degas or debulk the patch and remove air including volatiles from the patch 82. This degassing, which results in the removing of volatiles from the patch 82 help form a autoclave quality cure for patch 82.

Figure 66:
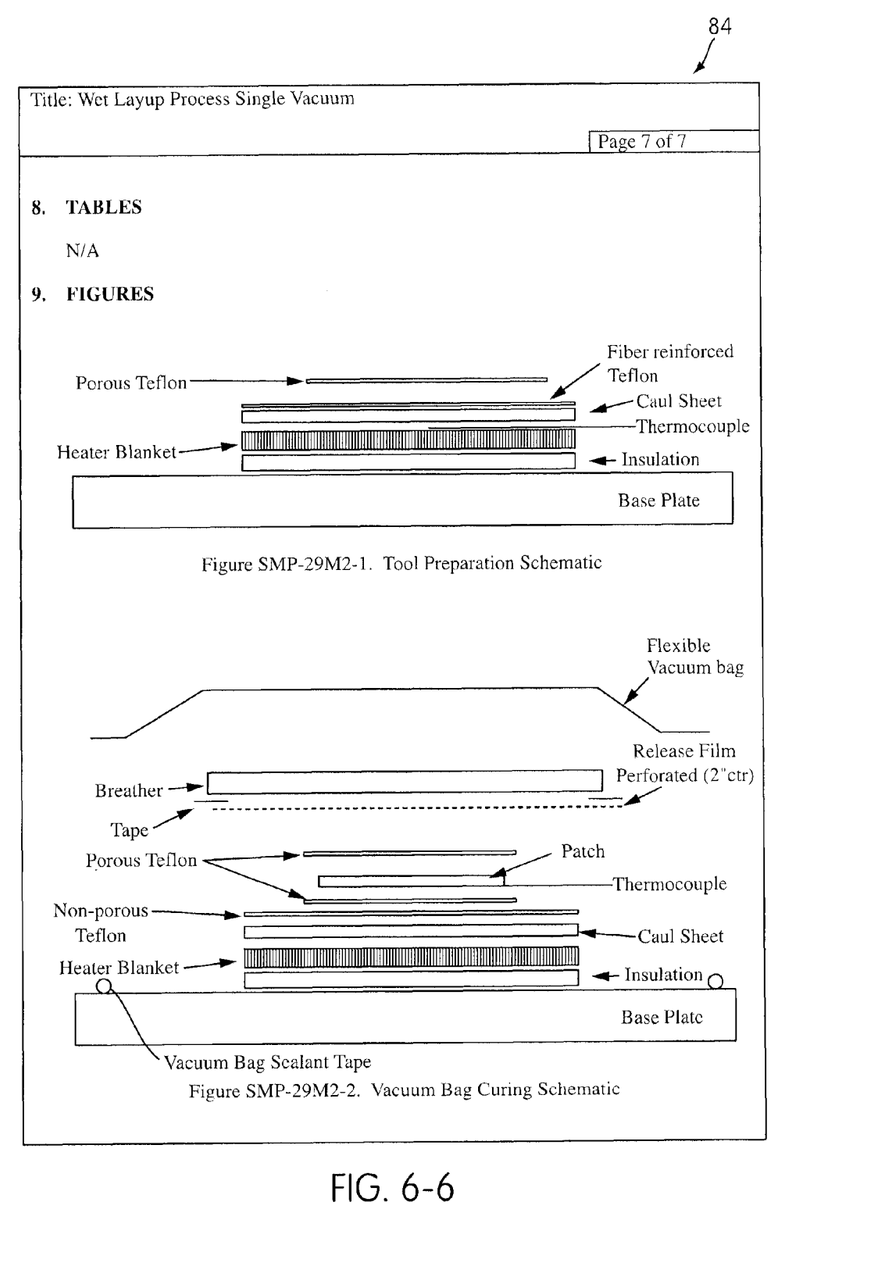

Once the patch 82 as been heated and degassed sufficiently to remove air and other volatiles from the patch 82, the patch may be removed from the caul sheet 94 while remaining attached to the porous layers (Step. 7.4.11, FIG. 6-6). The patch 82 is then applied to the structure 74 as seen in FIG. 5 and vacuum pressure and heat is again applied to the patch 82 to cure the patch 82. As mentioned above, a greater amount of vacuum will be applied to the patch 82 as well as a higher degree of heat for the ultimate curing of patch 82 as seen in FIG. 5.

The vacuum for the final curing may be provided by an appropriate vacuum-forming device such as a vacuum bag 76 attached to a vacuum and the heat may be provided by a known heating device 104. The combination of degassing the patch 82 as described above with vacuum and heat and then curing the patch with vacuum and heat provide for a patch that is securely attached to the structure 74 to the extent that the patch 82 is of the quality of patches that are provided to structures via an autoclave.

It should be understood that the specific amounts of vacuum and heat applied will vary depending upon various factors, including the number and type of fabric layers, the type and amount of resin used in forming patch 82, and the other elements of the patch 82 and its application to the structure 74.

Although FIG. 4 illustrates a situation where the patch is pre-formed and degassed on a base plate 92, e.g., for applications where a flat patch 82 is needed, the base plate 92 may be contoured to match any desired shape. Also, the patch 82 may be degassed while on the structure 74, for example, in situations where the patch 82 may be needed to take a unique contoured configuration consistent with a contour of the structure 74.

Also, although the more specific embodiments has described a composite patch 82 that is attached to a composite structure 74, such as portion of a helicopter, the degassing of a composite structure, such patch 82, to improve the quality of the patch 82 as described herein may be applied to any of the numerous situations outside of helicopters requiring such attachment of composite structures. For example, the methods herein are equally applicable to land or sea vehicle, especially those requiring repairs to structural members and those formed of composite materials.

The foregoing embodiments have been provided to illustrate the structural and functional principles of the present invention, and are not intended to be limiting. To the contrary, the present invention is intended to encompass all modifications, alterations, and substitutions within the spirit and scope of the appended claims.

What is claimed is:

1. A method of attaching a composite member to a structure, comprising:
    applying heat at a first temperature to an impregnated laminate within a single vacuum enclosure, the impregnated laminate being formed by impregnating with resin a fabric laminate;
    applying a partial vacuum at a first vacuum pressure within the single vacuum enclosure to the impregnated laminate to degas the resin in the impregnated laminate and form a degassed, impregnated laminate;
    positioning the degassed, impregnated laminate on a structure; and
    curing the degassed, impregnated laminate on the structure by applying heat at a second temperature and by applying vacuum at a second vacuum pressure within the single vacuum enclosure, the second vacuum pressure greater than the first vacuum pressure.

2. The method according to claim 1, wherein applying heat at the first temperature to the impregnated laminate comprises applying heat to the impregnated laminate with a heat up rate during a period of time to reach the first temperature.

3. The method according to claim 1, wherein the applying heat at the second temperature comprises applying heat at the second temperature that is greater than the first temperature.

4. The method according to claim 1, further comprising positioning the impregnated laminate on a heating device prior to applying heat at the first temperature.

5. The method according to claim 1, further comprising positioning the single vacuum enclosure around the impregnated laminate prior to applying heat at the first temperature.

6. The method according to claim 1, wherein the single vacuum enclosure consists of a single vacuum bag.

7. The method according to claim 1, wherein positioning the degassed, impregnated laminate on the structure comprises positioning the degassed, impregnated laminate on a structure of a vehicle.

8. The method according to claim 7, wherein the vehicle is a helicopter.

9. A method of attaching a composite patch to a structure to repair the structure, comprising:
    forming a laminate of fabric impregnated with resin to obtain an impregnated laminate;
    shaping the impregnated laminate to correspond to an area of a structure needing repair;
    applying heat at a first temperature to the impregnated laminate within a single vacuum enclosure;
    applying a partial vacuum at a first vacuum pressure to the impregnated laminate within the single vacuum enclosure to degas the resin and form a degassed, impregnated laminate;
    positioning the degassed, impregnated laminate on the area of the structure needing repair; and
    curing the degassed, impregnated laminate on the area of the structure needing repair by applying heat at a second temperature and by applying vacuum at a second vacuum pressure within the single vacuum enclosure, the second vacuum pressure greater than the first vacuum pressure.

10. The method according to claim 9, wherein the applying heat at the second temperature comprises applying heat at the second temperature that is greater than the first temperature.

11. The method according to claim 9, further comprising positioning the impregnated laminate on a heating device prior to applying heat at the first temperature.

12. The method according to claim 9, further comprising positioning the single vacuum enclosure around the impregnated laminate prior to applying heat at the first temperature.

13. The method according to claim 9, wherein the structure is a structure of a vehicle and the curing occurs with the impregnated, degassed laminate positioned on the structure of the vehicle.

14. The method according to claim 13, wherein the vehicle is a helicopter.

15. The method according to claim 9, wherein the single vacuum enclosure consists of a single vacuum bag.

16. The method according to claim 9, further comprising:
    applying the impregnated laminate to the area of the structure needing repair, after shaping the impregnated laminate; and
    subsequently to applying the impregnated laminate to the area of the structure needing repair, applying heat at the first temperature to the impregnated laminate and applying the partial vacuum at the first vacuum pressure to the impregnated laminate to degas the resin and form the degassed, impregnated laminate.

17. The method according to claim 9, wherein applying heat at the first temperature to the impregnated laminate comprises applying heat by positioning a heating device on or adjacent to the impregnated laminate.

18. The method according to claim 9, wherein applying heat at the first temperature to the impregnated laminate comprises applying heat to the impregnated laminate with a heat up rate during a period of time to reach the first temperature.

* * * * *